United States Patent [19]

Tamura

[11] 4,418,377
[45] Nov. 29, 1983

[54] APPARATUS TO PREVENT REFLECTION OF VEHICLE INSTRUMENT PANEL ILLUMINATION LIGHT

[75] Inventor: Takeo Tamura, Yokohama, Japan
[73] Assignee: Nissan Motor Co., Ltd., Yokohama, Japan
[21] Appl. No.: 185,645
[22] Filed: Sep. 9, 1980

[30] Foreign Application Priority Data

Sep. 20, 1979 [JP] Japan ............... 54-130989

[51] Int. Cl.³ .................................................. F21V 9/14
[52] U.S. Cl. ........................................ 362/19; 362/28; 362/61; 362/85; 362/293; 180/90
[58] Field of Search ............... 362/19, 28, 61, 85, 362/293; 180/90; 296/97 E

[56] References Cited

U.S. PATENT DOCUMENTS 2,200,300 5/1940 Roper .
4,311,365 1/1982 Tsuda et al. ............... 350/399

FOREIGN PATENT DOCUMENTS

| | | |
|---|---|---|
| 2353485 | 7/1975 | Fed. Rep. of Germany ........ 362/19 |
| 1428570 | 1/1965 | France . |
| 1239080 | 7/1971 | United Kingdom . |
| 1407279 | 9/1975 | United Kingdom . |
| 1452403 | 10/1976 | United Kingdom . |

*Primary Examiner*—Irwin Gluck
*Attorney, Agent, or Firm*—Thompson, Birch, Gauthier & Samuels

[57] ABSTRACT

A meter has a polarizing filter so that only light having a substantially horizontal wave motion is emitted therefrom. The meter is positioned beneath a canopy which prevents light from impinging on the vehicle windshield so that polarized light impinges on the side window where reflection thereof is attenuated due to the angle of incidence thereof. A non reflective surface is located adjacent the side window which adds to the attenuation of the reflected light.

10 Claims, 6 Drawing Figures

APPARATUS TO PREVENT REFLECTION OF VEHICLE INSTRUMENT PANEL ILLUMINATION LIGHT

BACKGROUND OF THE INVENTION

1. Field of the Invention

The present invention relates generally to a vehicle and more particularly to an arrangement that prevents light emitted from dash or instrument panel meters during night use from impinging on the windshield of the vehicle, and also lessens the adverse effect of any reflections of the light from the meters which impinges on the side windows of the vehicle.

2. Description of the Prior Art

In known arrangements, meters have been positioned below a instrument panel hood or canopy to prevent light from the meters from impinging on the windshield. However, this arrangement has suffered from the drawback that light still could pass unblocked from the meter or meters to the side window of the vehicle where it produced an image blocking the driver's clear view of a rear vision mirror mounted on the vehicle exterior.

SUMMARY OF THE INVENTION

The present invention features an instrument panel meter equipped with a polarizing filter which emits light having a substantially horizontal wave motion. The meter is disposed below the instrument panel hood or canopy to prevent light from impinging on the windshield of the vehicle so that the polarized light impinges only on the vehicle side window where it is attenuated due to its angle of incidence therewith. The present invention further features a non reflective surface located on or at the side window which disperses the impinging light, further adding to the attenuation of the reflection.

BRIEF DESCRIPTION OF THE DRAWINGS

The features and advantages of the arrangement of the present invention will become more clearly appreciated from the following description taken in conjunction with the accompanying drawings in which like reference numerals denote corresponding elements, and in which

FIG. 6 is a sectional view similar to FIG. 1, showing an arrangement wherein the polarizing filter is hinged to the instrument panel and which may secured either over the face of the meter or meters or clipped up under the canopy as desired;

DETAILED DESCRIPTION OF THE PREFERRED EMBODIMENTS

Figure 1:
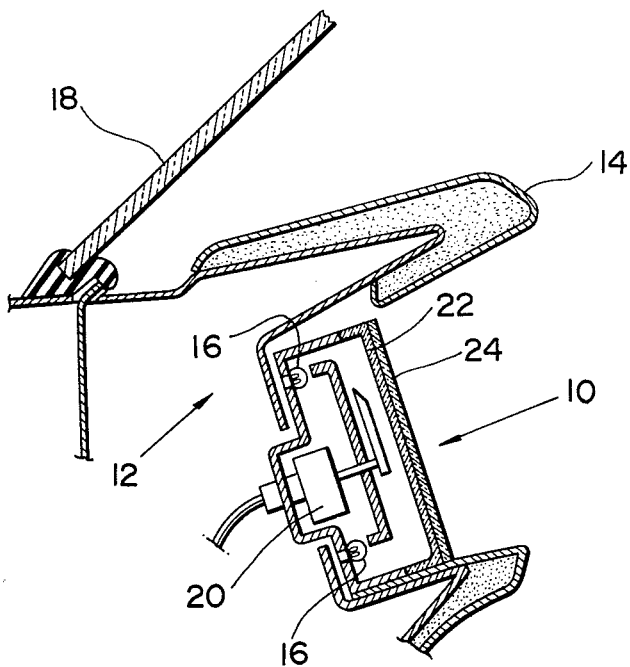
FIG. 1 is a sectional view of a meter mounted to a instrument panel of a vehicle according to the arrangement of the present invention.
Figure 3:
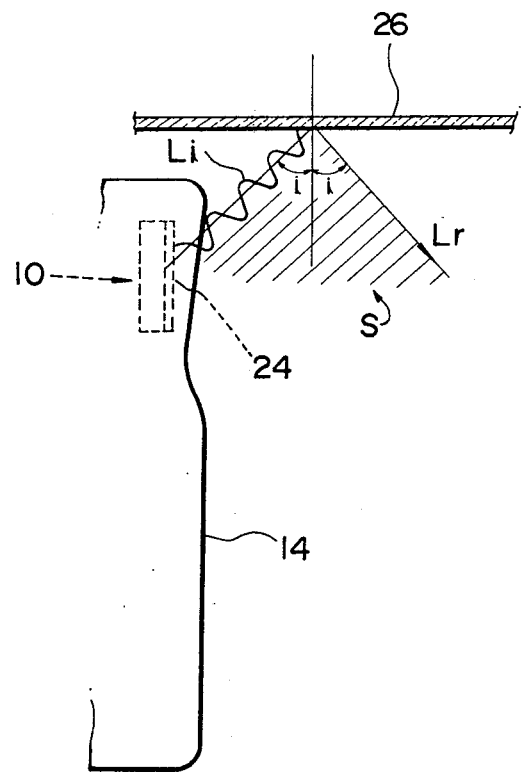
FIG. 3 is a plan view, partly in section, of the vehicle instrument panel and side window illustrating schematically the polarized light and plane of incidence thereof on the side window.

Turning now to the drawings and more specifically FIGS. 1 and 3, part of a first embodiment of the present invention is shown. As best shown in FIG. 1, a meter generally denoted by the numeral 10 is mounted to an instrument panel 12 which is provided with a padded hood or canopy 14. As shown, the meter 10 is positioned into the instrument panel 12 below the canopy 14 to prevent any light produced by a light source 16 within the meter from impinging on the windshield 18 mounted forward of and adjacent the instrument panel.

Figure 2:
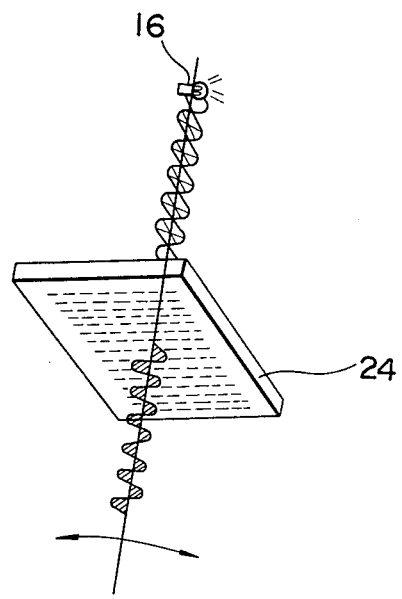
FIG. 2 is a perspective schematic representation of the polarization of the light from within the meter.

At the front of the meter 10, ahead of the indicator and drive mechanism 20, is a display plate 22 having indicia thereon. Over the top of the display plate 22 is disposed a polarizing filter 24, which serves to, as best seen in FIG. 2, permit therethrough the transmission of light having a wave motion which oscillates in a single plane only. Thus, as seen in FIG. 3, the polarizing filter 24 is oriented to emit polarized light toward the side window 26 of the vehicle, which light has a plane of oscillation parallel to the plane of incidence S of the light on the side window.

Given the equation $$\tan i = n$$

wherein:
 $n$ = the refractive index of the side window glass, and
 $i$ = the angle of incidence of the polarized light on the side window, it can be shown that wherein the refractive index of the glass is 1.4 to 1.6 (viz. commonly used glass), then the maximum attenuation of the reflection of the polarized light on the side window will occur when the angle of incidence (i) of the incident light ray Li thereon is between 54 and 56 degrees. (It should be noted at this point that in FIGS. 3 and 4, Li denotes the incident light ray, Lr denotes the reflected light ray and S denotes the plane of incidence defined by the incident and reflected rays).

Thus, it is highly preferred to arrange the meter in the instrument panel in such a manner that as much of the incident light ray Li impinging on the side window in fact impinges with an angle of incidence of between 54 to 56 degrees. However, since in actual practice, it is impossible to have all of the light impinge at this preferred angle, the invention further provides a non reflecting surface 27 at the side window to disperse the incident polarized light and increase the already notable attenuation thereof.

Figure 4:
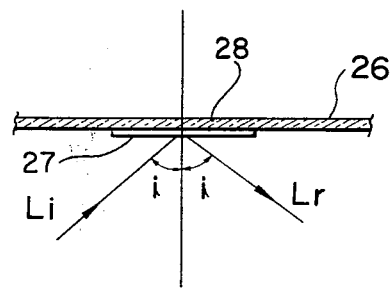
FIG. 4 is a sectional view of the vehicle side window which is provided with a non reflecting surface.

FIG. 4 shows a non reflecting sheet of material 28 (defining the non reflecting surface) adhered or otherwise fixed to the side window to perform the previously mentioned dispersion and attenuation of the reflected light.

Figure 5:
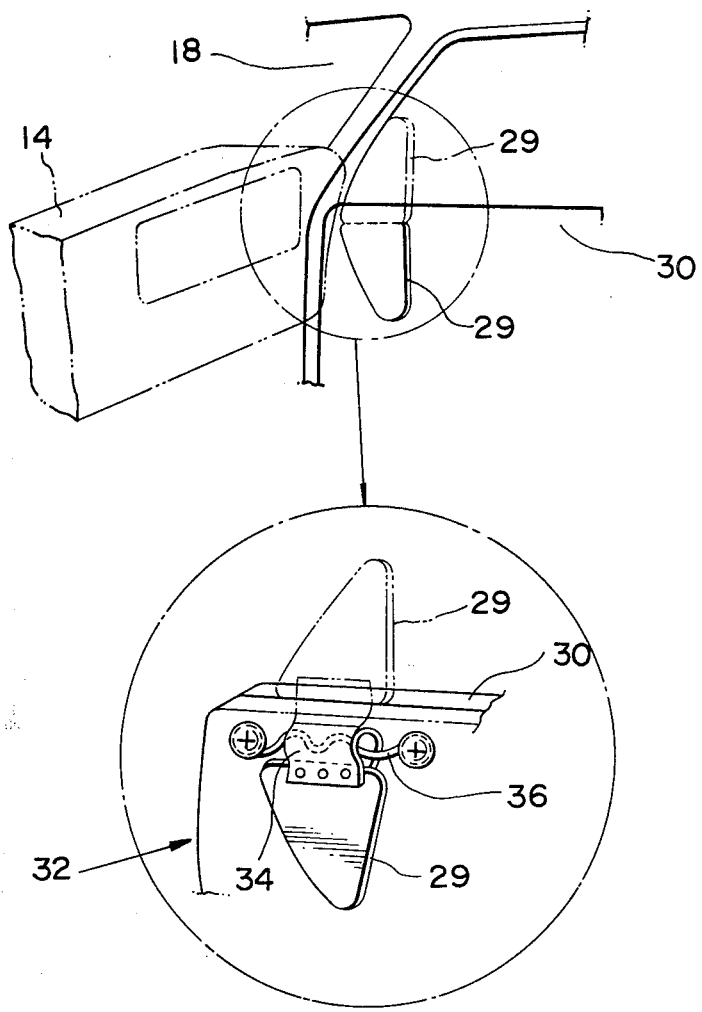
FIG. 5 is diagrammatic perspective view showing a hinged panel having a non reflecting surface which may be placed in a non use position or flipped up to attenuate reflection.

FIG. 5 shows another method of providing a non reflective surface at or near the side window. With this arrangement, a transparent, non reflective plate 29 (defining the non reflective surface) is mounted to the vehicle door 30 or the like by a snap action hinge 32. In the illustrated arrangement, the hinge comprises a simple loop arrangement 34 and a shaped spring 36 disposed through the loop and fixed at its ends to the door 30. Thus, during daylight use of the vehicle when reflection is not a problem, the plate 29 may be placed in the position illustrated in solid line and at night flipped up to the position illustrated in phantom to disperse and attenuate reflection.

FIG. 6 shows a further variation of the arrangement of the invention wherein the polarizing filter 24 is mounted to the instrument panel 12 by a suitable hinge 38 and adapted to be clipped up under the canopy 14 by a clip 40 during daylight use and placed over the front of the meter or meters 10 (as illustrated in phantom) for night use. With the arrangement of FIG. 6 the polarizing filter may take the form of a transparent plate which can cover the face of a number of meters simultaneously, thus simplifying vehicle instrument panel production.

Thus in summary, the present invention features the combination of a polarizing filter which polarizes the light emitted from a meter or meters so that the light impinging on the side windows of the vehicle is oscillating in a plane parallel to the plane of incidence S (which attenuates reflection) and a non reflecting surface at or near the side window for adding to the attenuation of the reflection. Of course a number of variations in the disposition and design of the polarizing filter and non reflecting surface (such as hinging one or both of the members for non use during daylight use) is possible without departing from the scope of the present invention. The canopy 14, of course, serves to block any light that would be otherwise strongly reflected from the windshield due to its plane of oscillation. Thus, with this arrangement, substantially all of the annoying and possibly dangerous reflections otherwise occurring within the vehicle during night use are eliminated, thus enhancing vehicle safety.

What is claimed is:

1. In a vehicle having a cabin, the combination of:
   an instrument panel having a light emitting meter;
   a windshield mounted forward of and adjacent said instrument panel;
   a canopy mounted on said instrument panel which shades said meter and blocks the transmission of light from said meter to said windshield;
   a side window oriented with respect to said meter so that light emitted from said meter impinges on said side window;
   a polarizing filter adapted to polarize the light emitted from said meter to attenuate the reflection of the light impinging on said side window; and
   a non reflective surface disposed adjacent said side window for further attenuating the reflection of said light impinging on said side window.

2. A combination as claimed in claim 1, wherein said polarizing filter is hingedly mounted to said instrument panel and is adapted to be clipped to the underside of said canopy when not in use.

3. A combination as claimed in claim 1, wherein said non reflecting surface is integrally formed on said side window.

4. A combination as claimed in claim 1, wherein said non reflecting surface takes the form of a transparent sheet which is attached to a portion of the surface of said side window.

5. A combination as claimed in claim 1, wherein said non reflecting surface is formed on a transparent plate hingedly mounted adjacent said window and adapted to be take an operative position juxtaposing said side window and a non use position.

6. In a vehicle, the combination of:
   an instrument panel having a light emitting meter;
   said windshield mounted adjacent to said instrument panel;
   a canopy mounted on said instrument panel between said meter and said windshield;
   a side window oriented with respect to said meter so that light emitted from said meter impinges on said side window;
   a polarizing filter adapted to polarize the light emitted from said meter to attenuate the reflection of the light impinging on said side window; and
   a transparent plate; and
   a non reflective surface formed on a transparent plate, said plate being mounted adjacent said side window for movement between an operative position in the path of the light impinging on said window, and an inoperative position removed from said path.

7. In a vehicle having a cabin, the combination of:
   an instrument panel having a light emitting meter;
   a windshield mounted forward of and adjacent said instrument panel;
   a canopy mounted on said instrument panel which shades said meter and blocks the transmission of light from said meter to said windshield;
   a side window oriented with respect to said meter so that light emitted from said meter impinges on said side window;
   a polarizing filter adapted to polarize the light emitted from said meter to attenuate the reflection of the light impinging on said side window, and polarizing filter being hingedly mounted to said instrument panel and being adapted to be clipped to the underside of said canopy when not in use; and
   a non reflective surface disposed adjacent said side window for further attenuating the reflection of said light impinging on said side window.

8. In a vehicle having a cabin, the combination of:
   an instrument panel having a light emitting meter;
   a windshield mounted forward of and adjacent said instrument panel;
   a canopy mounted on said instrument panel which shades said meter and blocks the transmission of light from said meter to said windshield;
   a side window oriented with respect to said meter so that light emitted from said meter impinges on said side window;
   a polarizing filter adapted to polarize the light emitted from said meter to attenuate the reflection of the light impinging on said side window, said polarizing filter being hingedly mounted to said instrument panel and being adapted to be clipped to the underside of said canopy when not in use; and
   a non reflective surface disposed adjacent said side window for further attenuating the reflection of said light impinging on said side window, said non reflective surface being formed on a transparent plate hingedly mounted adjacent said window for movement between a non use position and an operative position juxtaposing said side window.

9. In a vehicle having a cabin
   an instrument panel having a light emitting meter;
   a windshield mounted forward of and adjacent to said instrument panel;
   a canopy mounted on said instrument panel which shades said meter and blocks the transmission of light from said meter to said windshield;

a side window oriented with respect to said meter so that light emitted from said meter impinges on said side window;

a polarizing filter which is non-rotatable about an axis normal to its major surface and which is adapted to polarize the light emitted from said meter to attenuate the reflection of the light impinging on said side window; and a non-reflective surface disposed adjacent said side window for further attenuating the reflection of said light impinging on said side window.

10. A vehicle as claimed in claim 9, wherein said polarizing filter is hingedly mounted on said instrument panel so as to be pivotable away from said meter and adapted to be clipped to the underside of said canopy when not in use.

* * * * *